United States Patent Office 3,120,503
Patented Feb. 4, 1964

3,120,503
COPOLYMERS OF CAPROLACTAM AND AMINO-CYCLOHEXANE CARBOXYLIC ACID
Ross M. Hedrick, Edward H. Mottus, and John M. Butler, Dayton, Ohio, assignors to Monsanto Chemical Company, St. Louis, Mo., a corporation of Delaware
No Drawing. Filed Dec. 3, 1959, Ser. No. 856,898
19 Claims. (Cl. 260—78)

This invention relates to a novel polyamide composition of matter and to the polymerization process employed to produce same. More particularly the instant invention relates to a copolymer polyamide composition consisting of the copolymer product of a bicyclic lactam and a higher monocyclic lactam containing at least six carbon atoms in the lactam ring, wherein the reaction is effected by the anionic polymerization of said lactams in the presence of an N,N-diacyl promoter compound.

It is well known that several polymerization processes have been suggested for the polymerization of the higher monocyclic lactams, e.g. caprolactam. One method has been the hydrolytic process wherein the caprolactam is heated at an elevated temperature of about 200° to 300° C. under super-atmospheric pressure in the presence of not less than 0.1 mole and preferably from 1 to 4 moles, but less than 10 moles of water in an initial reaction and the polymerization is subsequently continued at atmospheric pressure, or under a reduced pressure, to remove the water and unreacted monomer (U.S. Patent No. 2,241,322). Another process for the catalytic conversion of caprolactam into polycaprolactam (nylon-6) is by the two-stage reaction of the caprolactam in the presence of metallic sodium or any of the alkali or alkaline earth metals. The initial reaction is carried out at 100° to 150° C., and thereafter the polymerization is effected at a temperature of about 230° to 250° C. for a period of 0.5 to 2 hours (U.S. Patent No. 2,251,519). Still another process for the polymerization of caprolactam employs alkali metal hydrides as catalysts and effects the polymerization at temperatures above the melting point of the polycaprolactam and the preferred temperature is in the range of from about 230° to 260° C. (U.S. Patent No. 2,647,105). Another process for the polymerization of caprolactam employs a mixed catalyst of alkali metal hydroxide and alkali metal, or alkali metal amide, or alkali metal hydride, at polymerization temperatures in the range of about 215° to 265° C. (U.S. Patent No. 2,805,214).

The principal object of the instant invention is to provide new polyamide compositions of matter. Another object of this invention is to provide a process for the copolymerization of bicyclic lactams with monocyclic higher lactams. Other objects and advantages of this invention will be apparent to those skilled in the art from the following disclosure.

It has now been found that improved polyamide copolymer products can be obtained by the copolymerization of a bicyclic lactam and a monocyclic higher lactam containing at least six carbon atoms in the lactam ring. These novel copolymer products have been found to have a number of desirable physical characteristics which are useful in the preparation of various polyamide objects, as hereinafter more fully set forth. Among these physical characteristics several properties are particularly noteworthy. Thus the presence of from about 10 to about 15 mole percent of the bicyclic lactam in the copolymer composition provided products which were translucent to very clear. Also the copolymer products provide a composition which is tougher than for example polycaprolactam alone. Additionally it was found that the copolymer product provided compositions having outstanding high-temperature properties, whereby the high melting copolymer polyamide could be cast polymerized as an object which can then be employed at substantially higher temperatures than a homopolymer prepared from the higher monocyclic lactam alone.

Suitable bicyclic lactams are 3-aminocyclohexanecarboxylic acid lactam, hereinafter referred to as "bicyclic-3," which can be readily prepared from m-nitrobenzoic acid followed by hydrogenation to reduce the nitro group to an amino group and hydrogenate the benzene ring, followed by heating to effect ring closure between the amino group and the carboxylic acid group by the distillation of water therefrom, and 4-aminocyclohexanecarboxylic acid lactam, hereinafter referred to as "bicyclic-4," which can be prepared in a similar manner from p-nitrobenzoic acid. The higher monocyclic lactams containing at least six carbon atoms in the lactam ring are preferably selected from the group consisting of ε-caprolactam, enantholactam, and capryylolactam, i.e. lactams respectively containing six, seven, and eight carbon atoms in the lactam ring, but other higher monocyclic lactams can also be employed, for example, cyclododecanone isoxime, cyclopentadecanone isoxime, and the like, and the lactams may contain a plurality of amide groups in the ring structure, as for example, cyclic monomeric hexamethylene adipamide, and the like.

The suitable anionic polymerization catalysts for the instant polymerization process are the alkali and alkaline earth metals, such as sodium, potassium, lithium, calcium, strontium, barium, magnesium, etc., either in metallic form or in the form of hydrides, borohydrides, oxides, hydroxides, carbonates, etc. However, in the case of catalyst compounds such as the hydroxides and carbonates, which give off water when reacted with the lactams, the bulk of such water must be removed from the polymerization system as for example by the application of heat under reduced pressure conditions such that the system is essentially anhydrous and anionic polymerization can take place. Thus the active catalyst species is the alkali metal or alkaline earth metal salt of the particular lactams present in the system. Accordingly, such lactam salts can be prepared and used directly as the anionic polymerization catalysts, if desired, for example sodium caprolactam, potassium caprolactam, lithium caprolactam, sodium enantholactam, potassium caprylolactam, and the like.

The aforesaid class of anionic polymerization catalysts can be employed singly or in combination to effect the polymerization of the instant copolymer compositions. The catalyst concentration can be varied from a small fraction of one persent, e.g. 0.01 percent, to as much as about 15 to 20 mole percent, based on the sum of the mole amounts of the bicyclic lactams and the higher monocyclic lactams being copolymerized. In most instances, however, the preferred anionic polymerization catalyst concentration varies from about 0.1 to about 1 mole percent of the aforesaid lactam monomers.

The suitable N,N-diacyl promoter compounds employed to effect the copolymerization of the bicyclic lactams and the higher monocyclic lactams in conjunction with the aforesaid anionic polymerization catalysts can be selected from the general class of compounds containing the essential active group:

wherein N is a tertiary nitrogen atom, i.e., has no hydrogen atom attached directly thereto, A is an acyl radical selected from

or

and B is an acyl radical selected from

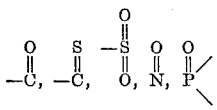

or

and R is a third substituent of the same kind of general type as A or B; or a hydrocarbyl radical such as aryl, alkyl, aralkyl, alkaryl, cycloalkyl, etc.; or a heterocyclic radical such as pyridyl, quinolyl, etc.; or any of the aforementioned groups substituted with or containing additional radicals or groups such as carbonyl, N-substituted carbamyl, alkoxy, ether, sulfonyl, tertiary amino, etc.; or any other non-interfering groups, i.e., group which will not preferentially react with the lactams or which will not otherwise interfere with the essential effective activity of the polymerization catalyst.

The substituents attached to the carbonyl, thiocarbonyl, sulfonyl, phosphonyl and thiophosphonyl radicals A and B are unlimited, provided they are free from interfering groups. Examples of non-interfering groups are hydrogen atoms, as well as hydrocarbyl and heterocyclic radicals mentioned in the preceding paragraph, including such radicals substituted with or containing polar-substituents such as tertiary amino, acylamido, N-substituted carbamido, ether, etc. The radicals A and B can be attached together to form a ring system (e.g., the cyclic imides described in greater detail below). Likewise, the radical A and the tertiary nitrogen atom can constitute a part of a ring system not including the radical B (e.g., the lactams described below).

A preferred class of materials having the aforementioned structure are N-substituted imides, i.e., compounds of the foregoing type having at least two acyl groups attached directly to the tertiary nitrogen atom. This group of compounds can be represented by the following structural formula:

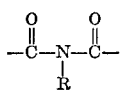

A particularly effective class of N-substituted imides are the N-acyl lactams such as N-acetyl-2-pyrrolidone, N-acetyl - ε - caprolactam, N - benzoyl - ε - caprolactam, N - benzoyl - δ - valerolactam, N - ethylcarbamyl - ε-caprolactam, N-propionyl-ω-caprolactam, N-toloyl-ω-decanolactam, etc.

Another preferred class of N-substituted imides comprise the cyclic imides of dicarboxylic acids. Examples of this class are N-phenylsuccinimide, N-phenylmaleimide, N-methylsuccinimide, N-methylphthalimide, N-acetyltetrahydrophthalimide, N-benzoylsuccinimide, N-benzoylphthalimide, etc.

Another preferred class of N-substituted imides comprise those having a multiplicity of the essential N,N-diacyl tertiary nitrogen atom groups. This class includes compounds in which a portion of the group (for example, an acyl radical) is common to two or more of the essential polymerization-promoting structures. Examples of this class are the N,N′,N′′-trimethylester of isocyanuric acid, N,N′ - di(phenylcarbamyl) - N,N′ - dimethylureas, ethylene disuccinimide, etc.

Examples of other N-substituted imides suitable for the above-described improved polymerization are N,N-diacetylmethylamine, N,N-dibenzoylaniline, triacetamide, N-acetyl-N-formyl ethylamine, N-propionylsaccharin, etc.

Another general class of compounds useful for the polymerization process comprise the N-acyl sulfonamides containing no hydrogen atom on the sulfonamide nitrogen atom. Examples of this general class of materials are N-acetyl-N-ethyl-p-toluenesulfonamide, N-ethyl-N-lauroylethanesulfonamide, N,N - diacetylmethanesulfonamide, N - (phenylsulfonyl)succinimide, N-methylsaccharin, N-acetylsaccharin, N-acetyl-N-methylbenzenesulfonamide and numerous other N-acyl sulfonamides.

Another class of suitable compounds for the polymerization process comprise the disulfonamides, such as N,N-di(p-toluenesulfonyl)anilide, N,N - di(benzenesulfonyl)methylamine, and other N,N-dibenzenesulfonyl alkylamines, as well as the corresponding N,N-dialkane sulfonylalkylamines such as N,N-di(methanesulfonyl)-ethylamine, etc.

Another general type of effective promoter compounds comprise the N-nitrosoamides. Representative members of this class of compounds are N-nitroso-2-pyrrolidone, N-nitrososuccinimide, N,N-diacetylnitrosoamine, N-nitroso-N-acetyl-propylamine, N-nitroso-N,N′-di-n-butylurea, N-methyl-N-nitrosourethane and other N-substituted N-nitroso-carbamates, etc.

Another general class of promoters for the polymerization process comprises the N-nitrososulfonamides, such as N - nitroso - N - methyl - benzenesulfonamide, N-nitroso - N - methyl - p - toluenesulfonamide, N - nitroso-N - ethyl - methanesulfonamide, N - nitroso - N - phenethylbutanesulfonamide, etc.

Yet another class of promoters comprises N-acyl-N-phosphinyl tertiary nitrogen compounds, such as N-(dimethylphosphinyl) - ε - caprolactam, N,N - bis(diethylphosphinyl)methyl amine, N-[ethyl(methyl)phosphinyl] pyrrolidone, N-(diethylphosphinyl)-N-methylacetamide, N - (diethoxyphosphinyl) - N - methyl - p - toluenesulfonamide, etc.

As was indicated above, one or more of the acyl oxygen atoms of the various compounds described herein can be replaced by sulfur atoms to form the corresponding thioacyl compounds without destroying the effectiveness of such compounds as promoters for the polymerization of the aforesaid lactams. Examples of such thio compounds are 1-acetyl-2-thiohydantoin and 3-butyl-5,5-dimethyl - 2 - thio - 2,4 - oxazolidinedione. Other suitable thio analogs of the foregoing acyl compounds are N-thiobenzoyl-2-pyrrolidone, N-thiopropionylmaleimide, N-phenyldithiosuccinimide, N-(n-octylcarbamyl)-2-thiopyrrolidone, N-(dimethylthiophosphinyl)-ε-caprolactam, etc.

Although the preceding description has been set forth in terms of addition of the present N,N-diacyl tertiary nitrogen promoters to the lactam monomer or lactam polymerization mixture, it should be recognized that these promoters can easily be formed in situ in the polymerization reaction mixture. Thus, for example, n-butylamine and phthalic anhydride can be added separately to the lactam monomer, and will react therein to form N-n-butylphthalimide, an effective promoter.

A particularly effective way to generate the present promoters in situ is to add a compound which will acylate the lactam monomer itself, to form an N-acyl lactam promoter. The principal criterion of such acylating additives is that they be ones which will acylate the lactam monomer (under the particular conditions employed) more readily than the lactam monomer molecules will acylate each other (i.e., by breaking the lactam ring and reacting with other lactam molecules to form N-(ε-aminocaproyl)-ε-caprolactam). Examples of suitable lactamacylating agents for in situ formation of promoters useful in this invention are ketenes, isocyanates (e.g., ethyl isocyanate and p-phenylene diisocyanate), phosgene, esters (e.g., diethyl adipate, dioctyl carbonate, N-butyl palmitate and polyvinyl acetate), N-carboxyamino acid anhydrides (e.g., glycine N-carboxyanhydride and isatoic anhydride), amides (e.g., N,N-diphenylformamide and acetanilide), sulfonamides (e.g., N-methyl p-toluenesulfonanilide and N,N-diphenyl p-toluenesulfonamide), acid chlorides (e.g., acetyl chloride, benzoyl chloride and carbamyl chlorides), acid anhydrides (e.g., maleic anhydride and phthalic anhydride) urethanes (e.g., isopropyl, N-phenyl carbamate, diethyl carbamate, and 2-keto-tetrahydro-1,3-oxazine), ureas (e.g., sym. diphenylurea, sym. dimethylurea and tetramethylurea), as well as numerous others.

The amount of the N,N-diacyl promoter in the polymerization process can be varied to contain up to about 5 mole percent of the aforesaid bicyclic and higher monocyclic monomers and will preferably vary from about 0.05 to about 2 mole percent, and more preferably still from about 0.1 to about 1 mole percent of the aforesaid bicyclic and higher monocyclic monomers.

To preclude the presence of large inert groups being present in the above-described N,N-diacyl promoters it is preferred that the molecular weight of the compound does not exceed about 1000 and more preferably still does not exceed about 500.

Whereas the aforesaid class of promoter compounds are suitable for the instant polymerization process it is preferred to employ the less complex compounds embraced within the aforesaid generic disclosure, wherein R and any unsatisfied bond of the various acyl radicals are hydrocarbon radicals containing not more than 10 carbon atoms therein, and more preferably still the aforesaid hydrocarbon radicals are free from non-benzenoid unsaturation.

Polymerization temperatures of from about 110° to 210° C. or higher can be employed but in general temperatures of from about 160° to 180° C. are preferred. For cast-polymerization operations the polymerization is carried out at a temperature above the melting point of the particular mixed monomer composition but below the melting point of the copolymer composition produced therefrom.

It will also be understood that the term "copolymer" as employed herein embraces compositions containing one or more of the bicyclic lactams copolymerized with one or more of the monocyclic higher lactams.

The novel copolymer compositions of the instant invention are useful in injection, extrusion, and compression molding operations to provide various articles of manufacture such as combs, bottles, gears, other mechanical shapes, rods, tubes, laminated objects, unsupported sheet films, objects containing a coated film thereon as electrical wire, cable and the like. The instant polymerization process also is readily adaptable to centrifugal casting of large diameter pipe, rocket motor casings, and other objects and can be polymerization-cast in the shape of any desired article such as large gears, complex shapes as marine propellers, and the like. In view of their toughness and high temperature stability these copolymer compositions are also suitable in combination with various oxidants uniformly dispersed therein to be polymerization-cast in the form of propellant grains for solid fuel rocket engines. Additionally the instant copolymer compositions can be employed together with inert reinforcing agents and fillers such as glass fiber, clay, talc, etc., by polymerization-casting below the melting point of the copolymer to provide useful molded objects, such as rocket nose cones, marine propellers, large gears, and the like. Also objects can be produced by pressure molding of finely divided copolymer compositions and subsequent sintering of the formed object.

The polymerization reactions were carried out in a closed reaction vessel, or mold, fitted with an inlet for introducing dry nitrogen gas and an outlet to release any volatiles, or off-gases produced in the reaction, and permit the vessel to be swept with nitrogen. The reaction vessel, or mold, was dried, then the monomers were introduced thereto in the desired proportions, the selected anionic polymerization catalyst added and the reaction vessel or mold placed in a heated thermostatically controlled oil bath to obtain the desired polymerization temperature. It will be understood that the selected monomers together with, or without, the anionic polymerization catalyst can be heated above their melting point and transferred to a suitable mold particularly if a large object is being produced, such that the heat of the mass together with the heat of reaction will be sufficient to effect the polymerization of the mass in place without supplying additional heat to the system. In using large molds in this way it is preferable that the promoter be added slowly over the period of time that it requires to fill the mold such that said promoter will be substantially uniformly distributed throughout the reaction mass. In this way the difficulty of mixing in the promoter is avoided, especially when a complex mold is employed. The polymerization of the copolymer system usually sets in within a period of about five minutes or less after the introduction of the promoter material, as evidenced by the rapid increase in viscosity of the polymerization system, hence if the mold is large and complex, it will be apparent that the aforesaid simultaneous proportional addition of the promoter to the reaction mixture is the preferred means of cast-polymerization. It is also desirable to preheat the mold such that it will not unduly chill the reaction mixture in contact with the mold surface.

In experimental polymerization reactions the desired monomers can be directly weighed into the reactor, heated to the desired temperature and the anionic polymerization catalyst added thereto and allowed a period of from about 5 to about 10 minutes to react therewith and be distributed therein prior to the addition of the promoter compound.

For best results the monomers employed in this polymerization reaction should be substantially free from water. Accordingly, the monomer should be freshly distilled to top off any water content or the monomer or mixture of monomers can be heated together with toluene to azeotrope off the water during the distillation of the added toluene. Additionally the subject bicyclic lactams preferably are sublimed at 120° C. under a pressure of from about 0.01 to about 0.1 mm. of mercury prior to polymerization to assure relative freedom from impurities.

Where conversion of the comonomers to the copolymer was evaluated the following procedure was employed. The copolymer composition was cooled to room temperature or lower and ground in a Cumberland Model O grinder to pass through a $3/16$ inch screen and then weighed. The ground product was then heated with five times its weight of 0.5 percent aqueous formic acid at the boiling point for two hours, filtered and the residue washed with distilled water. Then the residue was taken up in five times its weight of distilled water, boiled for one hour, filtered, washed with distilled water, and the residue transferred to a circulating air oven at 105° C., dried overnight, and weighed.

The following examples are illustrative of the instant invention.

Example 1

A mixture of 114.2 g. (1.01 mole) of freshly distilled caprolactam and 6.25 g. (0.05 mole) of bicyclic-4 was heated to 160° C. and 0.48 g. (0.01 mole) of a 50 percent sodium hydride dispersion was added thereto. Then 0.71 ml. (0.005 mole) of N-acetylcaprolactam was added thereto. The reaction mixture was observed to have a materially increased viscosity within two minutes after the addition of the promoter and was solid shortly thereafter. The reaction mixture was held at the reaction temperature overnight then the solid copolymer composition was broken up and treated with dilute formic acid and distilled water as described hereinabove. The conversion to copolymer was found to be 96.8 percent and the copolymer composition containing about 5 percent bicyclic-4 and 95 percent caprolactam was found to have an initial softening point of about 255° C.

*Example 2*

In similar fashion to Example 1 a mixed monomer composition of about 10 mole percent bicyclic-4 and 90 mole percent of caprolactam was treated with 0.01 mole of sodium hydride at 110° C. The clear fluid mixture was then heated to 160° C. and 0.005 mole of N-acetylcaprolactam added thereto. The reaction mixture was solid within a period of about 7 minutes after the addition of the promoter and the reaction mass held at the reaction temperature overnight. The solid copolymer product was found to have an initial softening point similar to the copolymer of Example 1.

*Example 3*

In similar fashion to Example 1, 98.4 g. (0.87 mole) of freshly distilled caprolactam and 18.8 g. (0.15 mole) of bicyclic-4 were introduced into the reaction vessel and the mixture heated to 160° C., 0.48 g. (0.01 mole) of a 50 percent sodium hydride dispersion added thereto and then 0.71 ml. (0.005 mole) of N-acetylcaprolactam was added. The reaction mass became solid about 9 minutes after the addition of the promoter compound and was held at the reaction temperature overnight. The solid copolymer composition was observed to be translucent and found to have an initial softening point of about 320° C.

*Example 4*

In similar fashion to Example 1, a mixture of 90.5 g. (0.80 mole) of freshly distilled caprolactam and 25.0 g. (0.20 mole) of bicyclic-4 was heated to 160° C. and 0.48 g. (0.01 mole) of a 50 percent dispersion of sodium hydride added thereto. Then 0.71 ml. (0.005 mole) of N-acetylcaprolactam added. The reaction mixture was observed to be solid about 15 minutes after the addition of the promoter compound. Then the reaction mixture was retained at the reaction temperature overnight and the copolymer composition was observed to be translucent and found to have an initial softening point of over 320° C.

*Example 5*

A mixture consisting of 28 mole percent of bicyclic-4 and 72 mole percent of caprolactam was melted under nitrogen and 0.01 mole of sodium hydride per mole of the lactams added thereto. Eight minutes after the catalyst addition 0.01 mole of N-acetylcaprolactam per mole of lactams was added to the reaction mixture. Heating was discontinued after about 6 hours and a hard, transparent copolymer composition was obtained which was found to have an initial softening point of greater than 370° C.

*Example 6*

A mixture of 101.7 g. (0.9 mole) of caprolactam and 12.5 g. (0.1 mole) of bicyclic-4 was heated to 160° C. under nitrogen. Then 0.12 g. (0.0025 mole) of a 50 percent sodium hydride dispersion was added to the reaction mixture and thereafter 0.35 ml. (0.0025 mole) of N-acetylcaprolactam introduced. Heating was continued overnight then the copolymer composition was cooled and the conversion was found to be about 95 percent. A sample of this copolymer composition was compression molded to provide a very clear, transparent molded sheet.

*Example 7*

A mixture of 6.3 g. (0.05 mole) of bicyclic-3 and 107.4 g. (0.95 mole) of caprolactam was heated to 160° C. in the reaction vessel and 1.9 ml. (1/180 equivalent) of ethylmagnesium bromide solution (3 moles/liter) was added thereto. Then 0.71 ml. (0.005 mole) of N-acetylcaprolactam was added and the reaction mixture became solid within about 3 minutes after the addition of the promoter compound. Thereafter the reaction mixture was allowed to stand overnight at the reaction temperature. The copolymer product was worked up and the conversion found to be about 98.1 percent and the initial softening point found to be about 230° C.

*Example 8*

A mixture of 12.5 g. (0.1 mole) of bicyclic-3 and 101.7 g. (0.9 mole) of caprolactam was reacted in a similar manner to Example 7, and the reaction mixture became solid within about 3 minutes after the addition of the promoter compound. The conversion was found to be about 97 percent and the initial softening point of the copolymer composition was found to be about 230° C.

*Example 9*

A mixture of 25.0 g. (0.2 mole) of bicyclic-3 and 90.4 g. (0.8 mole) of caprolactam was reacted in a similar manner to Example 7, with similar results except the initial softening point of the copolymer composition was found to be 245° C. The compression molded product from this copolymer composition was observed to be clear as was the product obtained by a similar copolymerization procedure employing 0.15 mole bicyclic-3 and 0.85 mole caprolactam.

*Example 10*

A mixture of 62.5 g. (0.5 mole) bicyclic-3 and 56.5 g. (0.5 mole) caprolactam was treated in a similar manner to the procedure set out in Example 7, except that 3.3 ml. (0.01 mole equivalent) of the catalyst and a reaction temperature of 180° C. were employed. The copolymer product was a light amber transparent composition and was found to have an initial softening point greater than 300° C.

In a similar experiment to that immediately above the equimolecular mixture of bicyclic-3 and caprolactam was heated to 210° C. and treated with 0.005 mole equivalent of the catalyst and 0.0025 mole equivalent of the promoter. The reaction mixture was solid about 8 minutes after the addition of the promoter and the reaction vessel and copolymer composition were cooled after a reaction time of 5 hours. The copolymer product was found to be clear and had an initial softening point of about 300° C.

This copolymer composition can also be prepared in good yield at substantially lower reaction temperatures. A mixture of 50 mole percent bicyclic-3 and 50 mole percent caprolactam was combined in the reaction vessel with a small amount of toluene and the mixture heated to about 110° C. to distill off the added toluene and azeotrope off any moisture in the system. Then 0.01 mole equivalent of ethylmagnesium bromide catalyst was added and thereafter 0.01 mole equivalent of N-acetylcaprolactam was introduced and the reaction mixture was held at about 110° C. overnight. The copolymer composition was cooled, worked up and the conversion found to be about 95 percent.

In yet another experiment employing 43 mole percent of bicyclic-3 and 57 mole percent of caprolactam treated with 0.005 mole equivalent of sodium hydride catalyst and 0.005 mole equivalent of N-acetylcaprolactam at a reaction temperature of from 160° to 165° C. for a period of about 6.5 hours the copolymer product was found to have an initial softening point greater than 370° C. However, there was evidence that the copolymer product contained a larger fraction of bicyclic-3 than present in the original reaction mixture, since a portion of caprolactam was removed from the reaction mixture during the subsequent work up.

*Example 11*

A mixture of lactam monomers consisting of 44 mole percent caprolactam, 31 mole percent bicyclic-4 and 25 mole percent bicyclic-3 was weighed out in a dry box, then stored for one week over phosphorus pentoxide prior to transfer to a reaction vessel and melting together at 160° C. under dry nitrogen. Thereafter 0.02 mole equivalent of sodium hydride catalyst and subsequently 0.01 mole equivalent of N-acetylcaprolactam were added. The reaction mixture set up rapidly and the reaction mass held at about 160° C. for 3 hours. The terpolymer product was found to be a translucent composition having an initial softening point greater than 300° C.

*Example 12*

A mixture of lactam monomers consisting of 33.3 mole percent caprolactam, 33.3 mole percent bicyclic-4, and 33.3 mole percent bicyclic-3 were melted together at 160° to 165° C. under nitrogen in a closed reaction vessel. Then 0.01 mole equivalents of ethylmagnesium bromide catalyst and subsequently 0.01 mole equivalent of the N-acetylcaprolactam promoter were introduced and the reaction mass held at about 160° C. overnight. The terpolymer product was observed to be a clear composition and was found to have an initial softening point greater than 300° C.

*Example 13*

A mixture of 57 mole percent of enantholactam together with 43 mole percent of bicyclic-4 were melted at 160° C. under nitrogen in a reaction vessel and 0.02 mole equivalent of ethylmagnesium bromide added thereto and mixed thoroughly therein. Then 0.005 mole equivalent of phenyl isocyanate was added to the reaction mixture forming the promoter in situ. The reaction mixture became a stiff mass within 7 minutes after the addition of the phenyl isocyanate. Heating was continued overnight and then the solid copolymer composition was recovered.

*Example 14*

A mixture of 59 mole percent freshly distilled enantholactam and 41 mole percent freshly sublimed bicyclic-3 was formed in the reaction vessel by introducing said materials to the reactor in a dry box. The mixture of lactams was then melted together at 110° C. under nitrogen and 0.02 mole equivalent of ethylmagnesium bromide added thereto. The reaction temperature was raised to 135° C. and 0.02 mole equivalent of N-acetylcaprolactam introduced. The reaction mass became solid in about 4 minutes and the reaction temperature lowered to 120° C. and held overnight. The copolymer product was observed to be clear, the conversion was found to be about 95 percent and the initial softening point of this composition was found to be about 320° C.

*Example 15*

Equimolecular quantities of caprylolactam and bicyclic-3 were introduced into the closed reaction vessel and about 10 ml. of dry toluene was added thereto. The content of the reaction vessel was then heated to 110° C. under dry nitrogen and the toluene distilled therefrom together with any moisture in the reaction mixture. Then 0.01 mole equivalent of ethylmagnesium bromide catalyst was added to the reaction mixture and subsequently 0.005 mole equivalent of N-acetylcaprolactam was introduced. The reaction mixture was solidified after a reaction time of less than about 0.5 hour. Heating at 110° C. was continued overnight then the reaction mass was cooled and the solid translucent copolymer mass was removed from the reaction vessel.

*Example 16*

Equimolecular quantities of caprylolactam and bicyclic-4 were introduced into the closed reaction vessel and dried with toluene in a similar manner to Example 15. The mixture was then heated to 180° C. and 0.01 mole equivalent of sodium hydride catalyst added to the reaction mixture followed by the addition of 0.01 mole equivalent of phenyl isocyanate to prepare the promoter compound in situ. The reaction mass was observed to be solid within 14 minutes after adding the phenyl isocyanaate. Heating at 180° C. was continued overnight then the reaction mass was cooled and the solid copolymer mass was removed from the reaction vessel.

From the foregoing examples it will be seen that organo- magnesium compounds can also be employed as the anionic polymerization catalyst. Preferred materials are the Grignard reagents and such illustrative organomagnesium halides are for example methylmagnesium bromide, phenylmagnesium bromide, ethylmagnesium iodide, cyclohexylmagnesium bromide, methylmagnesium chloride, butylmagnesium bromide, methylmagnesium iodide, t-butylmagnesium chloride, n-hexylmagnesium bromide, cyclohexylmagnesium chloride, ethylmagnesium bromide, isopropylmagnesium iodide, benzylmagnesium chloride, propylmagnesium bromide, t-butylmagnesium iodide, isoamylmagnesium bromide, ethylmagnesium chloride, benzylmagnesium bromide, isobutylmagnesium bromide, tolylmagnesium bromide, mesitylmagnesium bromide, naphthylmagnesium bromide, n-octadecylmagnesium bromide, triphenylmethylmagnesium bromide, 9-phenanthrylmagnesium bromide, and the like. The organomagnesium compounds are particularly useful for copolymers containing bicyclic-3.

The instant application is a continuation-in-part of our earlier applications Serial No. 627,984, filed December 13, 1956, now U.S. Patent No. 3,017,391, Serial No. 676,419, filed August 5, 1957, now U.S. Patent No. 3,017,392, and Serial No. 749,658, filed July 21, 1958, now U.S. Patent No. 3,028,369, which latter application was in turn a continuation-in-part of Serial No. 599,338, filed July 23, 1956, now abandoned. All of the aforesaid applications are incorporated herein by reference particularly to show the various suitable anionic polymerization catalysts and N,N-diacyl promoter compounds which can be employed in the instant invention.

We claim:

1. Copolymer compositions consisting of at least 5 mole percent of (1) a bicyclic lactam selected from the group consisting of 3-aminocyclohexanecarboxylic acid lactam and 4-aminocyclohexanecarboxylic acid lactam and (2) a higher monocyclic lactam containing at least six carbon atoms in the lactam ring.

2. The copolymer compositions of claim 1, wherein the lactams are caprolactam and 3-aminocyclohexanecarboxylic acid lactam.

3. The copolymer compositions of claim 1, wherein the lactams are caprolactam and 4-aminocyclohexanecarboxylic acid lactam.

4. The copolymer compositions of claim 1, wherein the lactams are enantholactam and 3-aminocyclohexanecarboxylic acid lactam.

5. The copolymer compositions of claim 1, wherein the lactams are enantholactam and 4-aminocyclohexanecarboxylic acid lactam.

6. The copolymer compositions of claim 1, wherein the lactams are caprylolactam and 3-aminocyclohexanecarboxylic acid lactam.

7. The copolymer compositions of claim 1, wherein the lactams are caprylolactam and 4-aminocyclohexanecarboxylic acid lactam.

8. The process of producing a copolymer polyamide composition consisting essentially of the anionic polymerization of at least 5 mole percent of (1) a bicyclic lactam selected from the group consisting of 3-aminocyclohexanecarboxylic acid lactam and 4-aminocyclohexanecarboxylic acid lactam and (2) a higher monocyclic lactam containing at least six carbon atoms in the lactam ring under substantially anhydrous conditions and in contact with from about 0.01 to about 20 mole percent of an anionic polymerization catalyst and from about 0.05 to about 5 mole percent of an N,N-diacyl tertiary-nitrogen-atom-containing promoter compound, free from primary amino groups, and having the structural formula

wherein the various substituents A, B and R are selected from the following groups: (a) R is selected from the group of acyl radicals consisting of B, monovalent hydrocarbon radicals and the class of modified monovalent hydrocarbon radicals containing at least one member of the group consisting of an oxa linking oxygen atom, an oxy linking oxygen atom, a thia linking sulfur atom, an aza linking nitrogen atom, an oxo oxygen atom, and a thio sulfur atom, and the sulfonyl, phosphonyl, thiophosphonyl and nitroso groups; (b)(i) A is selected from the group of acyl radicals consisting of carbonyl (R'CO—), thiocarbonyl (R'CS—), sulfonyl (R'SO$_2$—), phosphonyl (R$_2$'PO—), and thiophosphonyl (R$_2$'PS—) radicals, wherein R' is selected from the group consisting of hydrogen and R, excepting the group B directly linked to the non-R' moiety of the A group, and (b)(ii) divalent bridging radicals —R''—R''— and —R''—R'''— between one of the group A and B together and A and R together, respectively, wherein R'' is selected from the group R', and R''' is selected from the group R, and each such bridging radical contains one additional free valent bond whereby together they respectively convert AB and AR to a ring system including the tertiary-nitrogen-atom in said ring; and (c) B is selected from the group of acyl radicals consisting of carbonyl (R'CO—), thiocarbonyl (R'CS—), sulfonyl (R'SO$_2$—), phosphonyl (R$_2$'PO—), thiophosphonyl (R$_2$'PS—), and nitroso (ON—) radicals, wherein the R' group is as set forth above; no N,N-diacyl tertiary-nitrogen-atom-containing promoter compound has more than one nitroso group directly attached to any tertiary-nitrogen atom; and wherein the said catalyst and said promoter compound are each based on the sum of the mole amounts of the bicyclic lactams and higher monocyclic lactams.

9. The process of claim 8, wherein the higher monocyclic lactam is ε-caprolactam.

10. The process of claim 8, wherein the higher monocyclic lactam is enantholactam.

11. The process of claim 8, wherein the higher monocyclic lactam is caprylolactam.

12. The process of claim 8, wherein from about 0.1 to about 5 mole percent of an anionic polymerization catalyst and from about 0.05 to about 2 mole percent of the nitrogen-containing promoter compound are employed and the polymerization temperature is in the range of from about 110° C. to about 210° C.

13. The process of claim 12, wherein the higher monocyclic lactam is ε-caprolactam.

14. The process of claim 12, wherein the higher monocyclic lactam is enantholactam.

15. The process of claim 12, wherein the higher monocyclic lactam is caprylolactam.

16. The process of claim 12, wherein the promoter compound is an N-substituted imide.

17. The process of claim 16, wherein the promoter compound is N-acetylcaprolactam.

18. The process of claim 17, wherein the anionic polymerization catalyst is sodium hydride.

19. The process of claim 17, wherein the catalyst is ethylmagnesium bromide and the bicyclic lactam is 3-aminocyclohexanecarboxylic acid lactam.

References Cited in the file of this patent

UNITED STATES PATENTS

| | | |
|---|---|---|
| 2,805,214 | Zimmerman | Sept. 3, 1957 |
| 2,910,457 | Temin et al. | Oct. 27, 1959 |

FOREIGN PATENTS

| | | |
|---|---|---|
| 280,367 | Switzerland | May 16, 1952 |

OTHER REFERENCES

Ser. No. 323,512, Hagedorn (A.P.C.), published April 20, 1943.